United States Patent
Shibata

(10) Patent No.: US 6,926,327 B2
(45) Date of Patent: Aug. 9, 2005

(54) SIDE MEMBER AND BUMPER BEAM ATTACHING STRUCTURE

(75) Inventor: Koji Shibata, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/743,434

(22) Filed: Dec. 23, 2003

(65) Prior Publication Data

US 2004/0195864 A1 Oct. 7, 2004

(30) Foreign Application Priority Data

Dec. 25, 2002 (JP) .................................... P 2002-375200

(51) Int. Cl.⁷ .............................................. B60R 19/04
(52) U.S. Cl. ...................................... 293/155; 293/154
(58) Field of Search ................................ 293/155, 154

(56) References Cited

U.S. PATENT DOCUMENTS

| | | | | |
|---|---|---|---|---|
| 5,114,198 A | * | 5/1992 | Yamashita et al. | 293/155 |
| 5,829,805 A | * | 11/1998 | Watson | 293/155 |
| 6,174,009 B1 | * | 1/2001 | McKeon | 293/155 |
| 6,554,333 B2 | * | 4/2003 | Shimotsu et al. | 293/155 |
| 6,712,411 B2 | * | 3/2004 | Gotanda et al. | 293/155 |
| 2002/0113447 A1 | * | 8/2002 | Frank | 293/155 |

FOREIGN PATENT DOCUMENTS

JP  10-250505  9/1998

* cited by examiner

*Primary Examiner*—Lori L. Coletta
(74) *Attorney, Agent, or Firm*—Birch, Stewart, Kolasch & Birch, LLP

(57) ABSTRACT

A side member and bumper beam attaching structure has a side member adapted to retain the strength of a vehicle body in a longitudinal direction thereof, a bracket attached to the side member from a front or rear of the vehicle body, and a bumper beam attached to the bracket from the front or rear of the vehicle body. The side member has a closed cross-sectioned end portion at either a front end or a rear end of the vehicle body. The bracket is fitted into an inside of the closed cross-sectioned end portion for fixation to the side member.

11 Claims, 3 Drawing Sheets

SIDE MEMBER AND BUMPER BEAM ATTACHING STRUCTURE

CROSS-REFERENCE TO RELATED APPLICATION

This Nonprovisional application claims priority under 35 U.S.C. § 119(a) on Patent Application No. 2002-375200 filed in Japan on Dec. 25, 2002, the entire contents of which are hereby incorporated by reference.

BACKGROUND OF THE INVENTION

1. Field of the Invention

The present invention relates to a side member and bumper beam attaching structure.

2. Description of the Related Art

In general, side members are used on an underbody in order to increase the strength and rigidity of a vehicle body and extend in a longitudinal direction of the vehicle body to form a frame-like configuration. Bumper beams are provided at end portions of the side members to absorb an impact when the vehicle collides to thereby protect the vehicle body at the front and rear thereof.

In attaching a bumper beam to a side member, a substantially L-shaped bracket is disposed at an end portion of the side member in such a manner as to expand as viewed from the front or rear of the vehicle body. The bracket and the bumper beam are fixed together with bolts at outer positions of the side member and are then welded together.

When the bracket and the bumper beam are fixed together with bolts like this at the outer positions of the side member, the bolts are disposed at an interval which is equal to the width of the side member. In this case, a problem arises that a force generated when the vehicle collides becomes difficult to be transmitted efficiently to the cross section of the side member. To solve this problem, JP-A-10-250505 (Paragraph No. 0011, FIGS. 2 and 6) discloses a technique related to the structure of part of a vehicle body where a bumper is attached.

In the technique related to the structure of part of the vehicle body where a bumper is attached, two vertical walls of the side member having a rectangular closed cross section is held by a bracket from the outside at an end portion of the side member, and the outsides of the vertical walls and the bracket are arc welded together. Furthermore, bolts are disposed on the bracket at positions corresponding to inner positions of the side member so that a bumper beam is attached to the side member via the bolts so disposed.

According to this structure, the distance between the bolts for fixing the bracket and the bumper beam together becomes shorter, so that the deformation of the side member can be suppressed.

Incidentally, it is a general practice to attach a cross member to distal end portions of side members from the outside of the side members. Holding the distal end portions of the side members by brackets from the outside of the side members causes a problem that the attachment of members including the cross member to the distal end portions of the side members becomes troublesome. Namely, there occurs an interference of the brackets with the cross member at outside positions of the distal end portions of the side members. Therefore, in determining an attachment configuration for the cross member, not only the configuration of the distal end portion of the side member but also the configuration of the bracket need to be considered. This results in a problem that the efficiency of attachment work is deteriorated.

SUMMARY OF THE INVENTION

An object of the present invention is to provide a side member and bumper beam attaching structure which can improve the attachment properties of a peripheral component such as a cross member to a side member.

The invention comprises a side member of a vehicle body which extends in a longitudinal direction of the vehicle body and which has a closed cross-sectioned end portion at a longitudinal end thereof, a bracket which is attached to the side member from a front or rear of the vehicle body and which is fitted only into an inside of the closed cross-sectioned end portion and fixed to the side member, and a bumper beam attached to the bracket from the front or rear of the vehicle body.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PRESENT INVENTION

Referring to the accompanying drawings, an embodiment of the invention will be described below.

In FIGS. 1 to 4, a front side member and front bumper beam attaching structure according to an embodiment of the invention is shown. While FIGS. 1 to 4 illustrate an attaching structure on a right-hand side part of a vehicle body when viewed from the front of the vehicle body, a similar structure is also provided on a left-hand side part of the vehicle body, which is not shown.

A side member 10 according to the embodiment is disposed on either side of an engine compartment of the vehicle body in order to retain the strength and rigidity of the vehicle body in the longitudinal direction thereof. A bumper beam 60 is attached to a front end portion of the side member 10. A cross member 70 is attached to an outer circumferential side of a distal end portion of the side member 10. Note that not only the cross member 70 but also other peripheral components are attached to the distal end portion of the side member 10.

The cross member and other components are desirably provided at the distal end portion of the side member. This is because, when referring to a front cross member for an example, a radiator R (see FIGS. 1 and 2) which is supported on the front cross member needs to be disposed at as frontward a position as possible on the vehicle body so that the radiator R is located as far away from the engine E (see FIGS. 1 and 2) as possible so as to increase the cooling efficiency. In this case, it can be conceived that a longer front side member is designed so that the front cross member can be disposed at the distal end portion of the front side member made so longer. However, as a matter of vehicle body layout, in the event that the engine E is installed at the front of the vehicle body, the size of an engine compartment is limited. Due to this, it is not preferable to design such a longer front side member. The radiator R which is supported on the front cross member can be disposed at as frontward a position as possible on the vehicle body by attaching the front cross member to the distal end portion of the front side member, whereby increasing the cooling efficiency of the radiator R and using the engine E compartment effectively.

Figure 2:
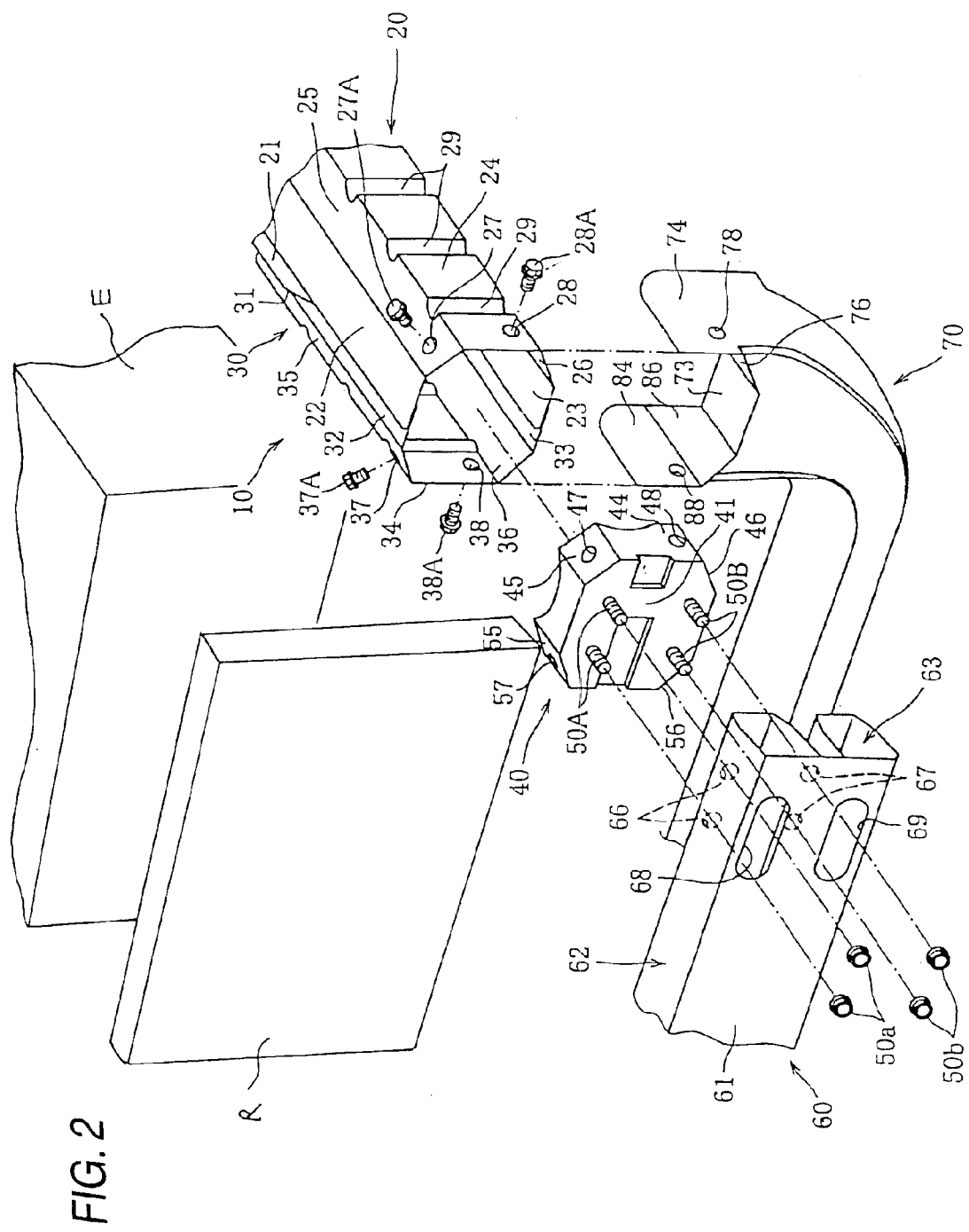
FIG. 2 is an exploded perspective view of the side member and bumper beam attaching structure shown in FIG. 1.
Figure 3:
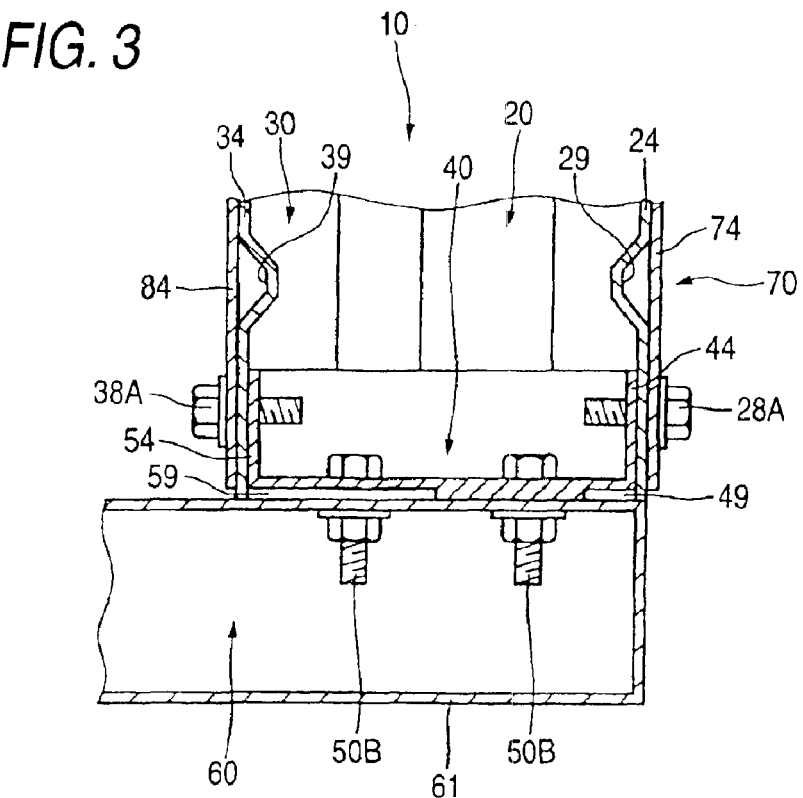
FIG. 3 is a cross-sectional view taken along line III—III in FIG. 1.

As shown in FIG. 2, the side member 10 includes an outer side member 20 and an inner side member 30, and both the side members 20, 30 are mated to each other to extend in a longitudinal direction of the vehicle body to thereby form a frame.

To be specific, firstly, the outer side member 20 is formed so as to have a semi-octagonal cross-sectional shape that can be formed by dividing an octagonal cross-sectional shape into two halves and is disposed such that an open portion thereof is faced transversely inwardly of the vehicle body. The outer side member 20 has an abutment portion 21 and flange portions 22, 23. The flange portion 22 and the flange portion 23 constitute a top side and a bottom side of the octagonal cross-sectional shape, respectively. A side of the octagonal cross-sectional shape is constituted by a vertical side portion 24, and sloping sides of the octagonal cross-sectional shape are constituted by a sloping side portion 25 connecting the flange portion 22 and the vertical side portion 24 and a sloping side portion 26 connecting the vertical wall portion 24 and the flange portion 23, respectively.

A pass-bolt hole 28 for allowing a bolt 28A to pass therethrough to fix a bracket 40 and the cross member 70 therewith is provided in the vertical side portion 24 at an appropriate position which is spaced away longitudinally rearward an appropriate distance from a front end of the vertical side portion 24. In addition, recessed portions 29 are provided vertically for absorbing impact generated at the time of collision. The recessed portions 29 may be formed by press working. In this case, the inside of the side member is recessed as well. Additionally, a pass-bolt hole 27 for allowing a bolt 27A to pass therethrough to fix the bracket 40 therewith is provided in the sloping side portion 25 at an appropriate position which is spaced away longitudinally rearward an appropriate distance from a front end of the sloping side portion 25.

The inner side member 30 is also formed so as to have a semi-octagonal cross-sectional shape that can be formed by dividing an octagonal cross-sectional shape into two halves and is disposed such that an open portion thereof is faced transversely outwardly of the vehicle body. The inner side member 30 has an abutment portion 31 and flange portions 32, 33. The flange portion 32 and the flange portion 33 constitute a top side and a bottom side of the octagonal cross-sectional shape, respectively. In addition, a side of the octagonal cross-sectional shape is constituted by a vertical side portion 34, and sloping sides of the octagonal cross-sectional shape are constituted by a sloping side portion 35 connecting the flange portion 32 and the vertical side portion 34 and a sloping side portion 3.6 connecting the vertical wall portion 34 and the flange portion 33, respectively.

A pass-bolt hole 38 for allowing a bolt 38A to pass therethrough to fix a bracket 40 and the cross member 70 therewith is provided in the vertical side portion 34 at an appropriate position which is spaced away longitudinally rearward an appropriate distance from a front end of the vertical side portion 34. In addition, recessed portions 39 (FIG. 3) are provided vertically for absorbing impact generated at the time of collision. Additionally, a pass-bolt hole 37 for allowing a bolt 37A to pass therethrough to fix the bracket 40 therewith is provided in the sloping side portion 35 at an appropriate position which is spaced away longitudinally rearward an appropriate distance from a front end of the sloping side portion 35.

The outer side member 20 and the inner side member 30 are mated to each other via a transverse adjustment jig (not shown), so as to facilitate fitting of the bracket 40. To be specific, the outer side member 20 and the inner side member 30 hold the transverse adjustment jig with the open portion of the outer side member 20 and an open portion of the inner side member 30 facing each other. Then, the abutment portion 21 and the abutment portion 31 are mated to each other in such a manner that the flange portion 22 overlaps a top side of the flange portion 32, whereas the flange portion 23 overlaps a top side of the flange portion 33. Thus, a distance between the vertical side portion 24 and the vertical side portion 34, that is, the width of the side member 10 is determined, and a closed cross-sectioned end portion having the octagonal cross-sectional shape is thus formed. Then, the side member 10, which has been adjusted transversely, is welded at not only the abutment portions 21, 31 but also the other portions such as the flange portions 22, 23, 32, 33 and is thereafter painted.

The bracket 40 is attached to the side member 10 so painted from the front of the vehicle body.

The bracket 40 includes a bumper abutment portion 41 and a member entry portion. The bumper abutment portion is formed into an octagonal shape and member entry portions are caused to extend toward the side member 10 from eight sides of the octagonal shape, respectively. To be specific, the member entry portion includes portions which are introduced into the side member 10, that is, a top side portion 42 (FIG. 4) which is introduced underneath the flange portion 22 and the flange portion 32, a bottom side portion 43 (FIG. 4) which is introduced on the flange portion 23 and the flange portion 33, a vertical side portion 44 which is brought into abutment against a left side of the vertical side portion 24, a vertical side portion 54 (FIG. 3) which is brought into abutment against a right side of the vertical side portion 34, a sloping side portion 45 and a sloping side portion 55 which are brought into abutment against bottom sides of the sloping side portion 25 and the sloping side portion 35, respectively, and a sloping side portion 46 and a sloping side portion 56 which are brought into abutment against top sides of the sloping side portion 26 and the sloping side portion 36, respectively. The bracket 40 is brought into contact with the inside of the side member 10 over the six sides thereof.

In addition, pass-bolt holes 48, 58 (FIG. 4), and 57 which allow the bolt 28A, the bolt 38A, the bolt 27A, and the bolt 37A to pass therethrough, respectively, to fix the bracket 40 to the side member 10 therewith are provided in the vertical side portion 44, the vertical side portion 54, the sloping side portion 45, and the sloping side portion 55 at appropriate positions which are spaced away longitudinally rearward an appropriate distance from front ends of those portions.

Four guide bolts 50A, 50B are integrally molded on the bumper abutment portion 41 in such a manner as to extend forward in the longitudinal direction of the vehicle body from an internal position inside the side member 10 when the bracket 40 is installed in the side member 10. Namely, the guide bolts 50A, 50B are such that threaded portions of the guide bolts 50A, 50B are allowed to protrude outwardly in a state in which the bracket 40 is installed in the side member 10. The bumper beam 60 is held and fastened on the guide bolts 50A, 50B between washers and nuts 50*a*, 50*b* and the bumper abutment portion 41 so that the bumper beam 60 is fixed to the side member 10. The two upper guide bolts 50A and the two lower guide bolts 50B are disposed in parallel with each other along a horizontal direction. Note that recessed portions 49, 59 (FIG. 3) are provided horizontally between the guide bolts 50A and the guide bolts 50B for absorbing impact generated at the time of collision.

The closed cross-sectioned end portion of the side member 10, which is formed into the octagonal shape, has a distal end portion. This distal end portion is a portion which configures an external shape of the closed cross-sectioned end portion and which is made up of the flange portion 22 and the flange portion 32, the flange portion 23 and the flange portion 33, the vertical side portion 24, the vertical side portion 34, the sloping side portion 25 and the sloping side portion 35, and the sloping side portion 45 and the sloping side portion 55. The cross member 70 is attached to the distal end portion from the under side of the distal end portion.

Figure 1:
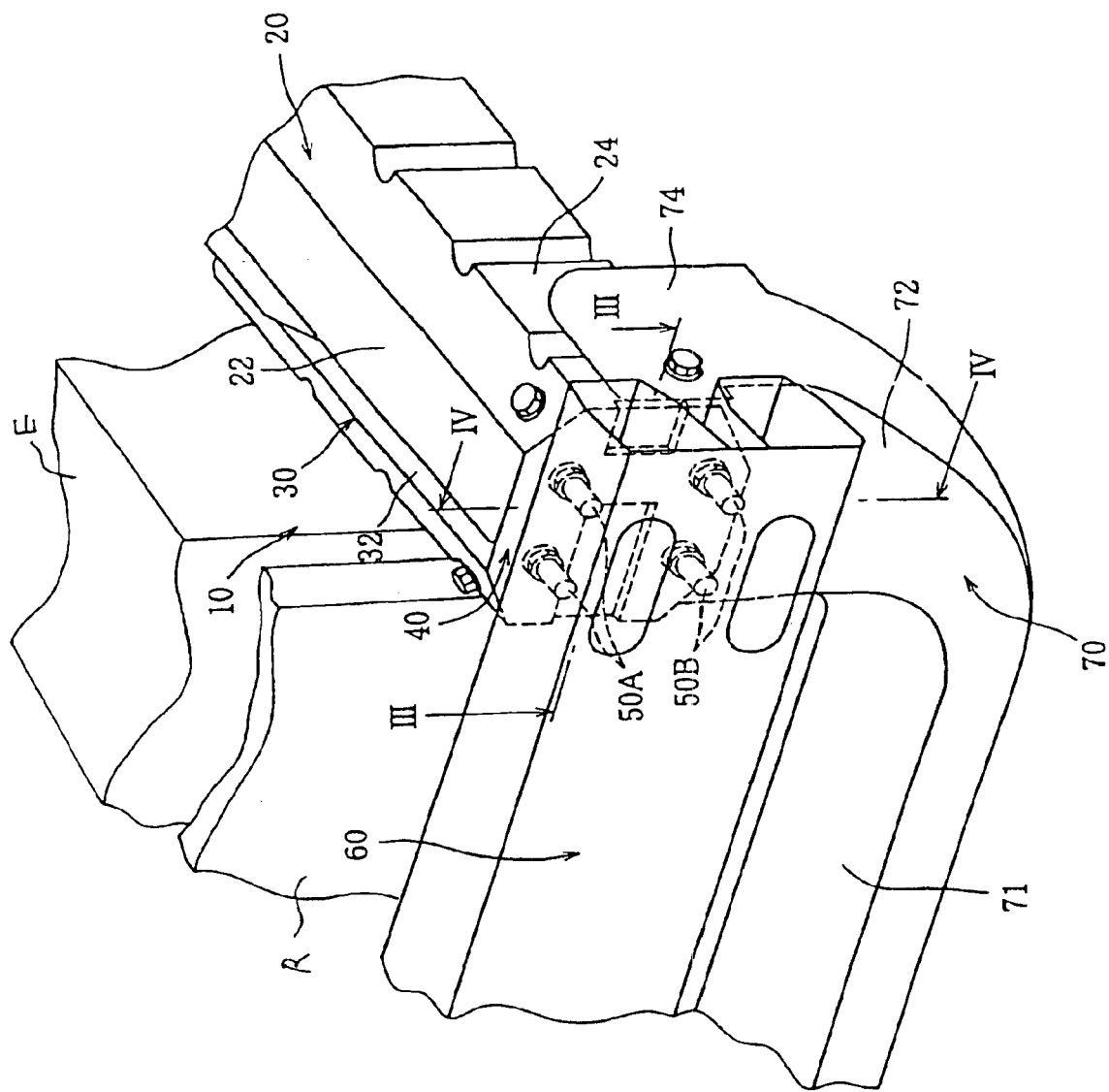
FIG. 1 is a perspective view of a side member and bumper beam attaching structure according to an embodiment of the invention.

The cross member 70 includes a transverse beam portion 71 and member engagement portions 72 (FIG. 1). As with the side member 10, the cross member 70 is used on the underside of the vehicle body in order to increase the strength and rigidity of the underbody.

The transverse beam portion 71 is positioned substantially horizontally at an front end of the vehicle body, and each of the member engagement portions 72 is caused to extend upwardly at each end of the transverse beam portion 71 for engagement with the distal end portion.

The member engagement portion 72 includes a support side portion 73 which is brought into abutment with lower sides of the flange portions 23, 33, a vertical side portion 74 which is brought into abutment with a right side of the vertical side portion 24, a vertical side portion 84 which is brought into abutment with a left side of the vertical side portion 34 and a sloping side portion 76 and a sloping portion 86 which are, respectively, brought into abutment with lower sides of the sloping side portion 26 and the sloping side portion 36. The member engagement portion 72 has the same shape as that of the distal end portion of the side member 10. Namely, the member engagement portion 72 is formed into an identical shape to the external shape of a lower half portion of the distal end portion which is formed into the octagonal closed cross-sectioned end portion. The shape of the bracket 40 does not affect the shape of the member engagement portion 72.

In addition, a pass-bolt hole 78 and a pass-bolt hole 88 which allow the bolt 28A and the bolt 38A to pass therethrough, respectively, to fix the member engagement portion 72 to the side member 10 therewith are provided, respectively, in the vertical side portion 74 and the vertical side portion 84 which are brought into abutment with the side member 10 at appropriate positions which are spaced away longitudinally rearward an appropriate distance from front ends of the vertical side portions.

The bumper beam 60 is provided on the side member 10 at the closed cross-sectioned end portion of the side member 10 via the bracket 40. This bumper beam 60 includes a front-end portion 61 positioned at the front end of the vehicle body, and an upper sideway portion 62 and a lower sideway portion 63 which continue to the front-end portion 61 along upper and lower edges of the front-end portion 61, respectively.

Figure 4:
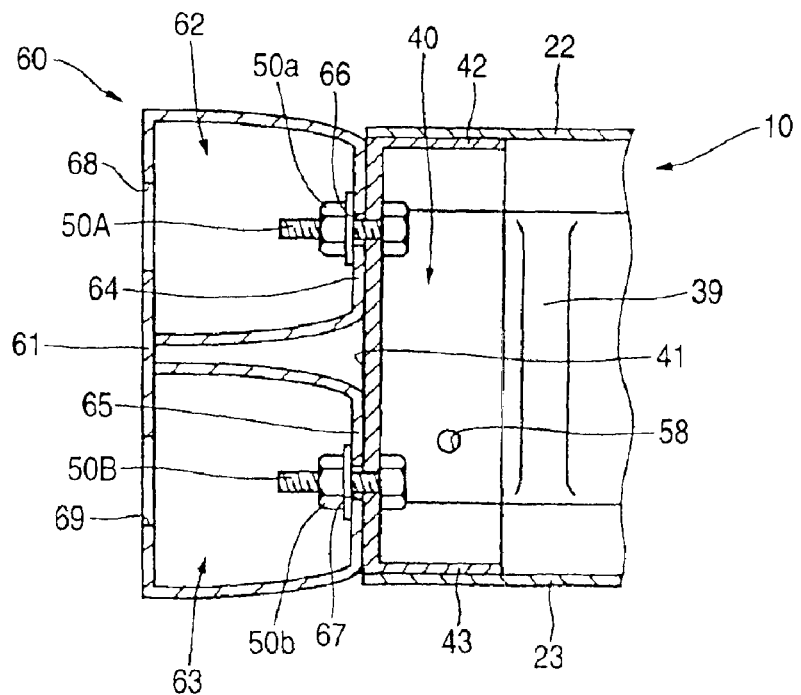
FIG. 4 is a cross-sectional view taken along line IV—IV in FIG. 1.

The upper sideway portion 62 and the lower sideway portion 63 are each made to open along one side thereof which constitutes part of their cross sections, and the open sides of the upper sideway portion 62 and the lower sideway portion 63 are made to face the front-end portion 61, whereas closed sides thereof are made to confront the bumper abutment portion 41 as bracket abutment portions 64, 65 (FIG. 4).

Receiving holes 66, 66 for receiving the guide bolts 50A, 50A, respectively, are provided in the bracket abutment portion 64 of the upper sideway portion 62. In addition, a working groove 68 for viewing the guide bolts 50A, 50A are provided in the front-end portion 61 at an appropriate position thereon which faces the guide bolts 50A, 50A. Receiving holes 67, 67 for receiving the guide bolts 50B, 50B, respectively, are also provided in the bracket abutment portion 65 of the lower sideway portion 63. Furthermore, a working groove 69 for viewing the guide bolts 50B, 50B are provided in the front-end portion 61 at another appropriate position thereof which faces the guide bolts 50B, 50B. Note that the working groove 68 and the working groove 69 are disposed in parallel with each other in the horizontal direction.

Subsequently, an attachment of the bracket 40 and the cross member 70 to the side member 10 and an attachment of the bumper beam 60 to the bracket 40 will be described below.

Firstly, the transverse adjustment jig is used to join the outer side member 20 and the inner side member 30 together. The closed cross-sectioned end portion having the octagonal cross section is defined by the side member 10. The closed cross-sectioned end portion includes the flange portion 22 and the flange portion 23, the sloping side portion 25, the vertical side portion 24, the sloping side portion 26, the flange portion 23, the flange portion 33, the sloping portion 36, the vertical side portion 34, and the sloping side portion 35. The distal end portion which corresponds to the external shape of the closed cross-sectioned end portion is formed on an external side of the side member 10.

The guide bolts 50A, 50A, 50B, 50B are provided on the bracket 40 in such a manner that the threaded portions thereof protrude toward the bumper beam 60.

Then, the bracket 40 is fitted in the inside of the closed cross-sectioned end portion of the side member 10 through abutment on the six sides between the sloping side portion 25 and the sloping side portion 45, the vertical side portion 24 and the vertical side portion 44, the sloping side portion and the sloping side portion 46, the sloping side portion 36 and the sloping side portion 56, the vertical side portion 34 and the vertical side portion 54, and the sloping side portion 35 and the sloping side portion 55. The bolt 27A is passed through the pass-bolt holes 27, 47 from the outside of the side member 10 so as to fix the sloping side portion 25 and the sloping side portion 45 together. The bolt 37 is passed through the pass-bolt holes 37, 57 from the outside of the side member 10 so as to fix the sloping side portion 35 and the sloping side portion 55 together.

Then, the member engagement portion 72 of the cross member 70 is fitted on the outer circumferential side of the distal end portion of the side member 10 from the under side to thereby provide abutment between the vertical side portion 24 and the vertical side portion 74, and the vertical side portion 34 and the vertical side portion 84, respectively. Then, abutment is provided not only between the flange portions 23, 33 and the support side portion 73 but also between the sloping side portion 26 and the sloping side portion 76, and the sloping side portion 36 and the sloping side portion 86. Then, the bolt 28A is passed through the pass-bolt holes 78, 28 from the outside of the cross member 70 so as to fix the vertical side portion 74 and the vertical side portion 24 together. The bolt 38A is passed through the pass-bolt holes 88, 38 from the outside of the cross member 70 so as to fix the vertical side portion 84 and the vertical side portion 34.

Thus, the cross member 70 can be easily attached to the side member 10 without considering the shape of the bracket 40. Note that the vertical side portion 44 and the vertical side portion 54 of the bracket 40 are also fixed to the side member 10 with the bolt 28A and the bolt 38A, respectively, whereby the side member 10 and the bracket 40 are bolted together on the four sides in total.

Finally, the bumper beam 60 is attached to the bumper abutment portion 41 of the bracket 40 from the front of the side member 10 with the guide bolts 50A, 50B being allowed to pass through the receiving holes 66, 67 while viewing the guide bolts 50A, 50B through the working groove 68 and the working groove 69. Thereafter, the washers and nuts 50a, 50b are brought into engagement with the guide bolts 50A, 50B through the working groove 68 and the working groove 69 for fixation thereto.

Thus, the bumper beam 60 can be easily attached to the bracket 40 using the guide bolts 50A, 50B which protrude forward of the vehicle body, whereby the working efficiency can be improved.

Incidentally, in the side member and the bumper beam attaching structure that is constructed as has been described heretofore, a force applied to the front-end portion 61 of the bumper beam 60 from the front of the vehicle at the time of collision is borne by the bracket 40 with good efficiency through the four guide bolts 50A, 50B which are disposed at the position which corresponds to the internal position inside the side member 10. Then, a force is generated on the bracket 40 inside the side member 10 so as to be applied to the rear of the vehicle body. This force is borne by the bolt 27A, the bolt 28A, the bolt 38A and the bolt 37A which fix the four symmetrical sides. Due to this, the side member 10 buckles at the recessed portions 29 while retaining the octagonal cross sectional shape. Consequently, the excessive and biased deformation of the side member 10 can be suppressed.

In addition, the bracket 40 can also deform via the recessed portions 49, 59 separately on the upper side where the guide bolts 50A, 50A are provided and the lower side where the guide bolts 50B, 50B are provided. Due to this, the construction can also suppress the excessive and biased deformation of the side member 10.

As has been described heretofore, the side member and bumper beam attaching structure according to the invention includes the side member 10 adapted to retain the strength of the vehicle body in the longitudinal direction, the bracket 40 attached to the side member 10 from the front of the vehicle body, the bumper beam 60 attached to the bracket 40 from the front of the vehicle body, and the cross member 70 adapted to retain the strength of the vehicle body in the transverse direction. The bracket 40 is formed into the same shape as that of the closed cross-sectioned end portion of the side member 10 so as to be fitted into the inside of the closed cross-sectioned end portion on the symmetrical sides of the closed cross-sectioned end portion, that is, to be specific, the four sides of the bracket 40 and the side member 10 which are formed into the octagonal shape and is fixed to the side member 10 with the bolts 27A, 28A, 37A, 38A from the outside of the side member 10. This eliminates the occurrence of an interference between the bracket 40 and the cross member 70 on the side member 10. The cross member 70 can be easily attached to the side member 10 without considering the shape of the bracket 10, thereby making it possible to better the attachment and design properties of the cross member 70. Since the side member 10 can buckle while retaining the cross section thereof at the time of collision, the deformation mode can be stabilized.

The invention is not limited to the embodiment that has been described heretofore but may be modified variously without departing from the spirit and scope of the invention.

For example, the embodiment discloses the structure for attaching the front bumper beam 60 to the front side member 10 on the vehicle body. However, the invention is not necessarily limited to this particular construction but may be applied to a structure for attaching a rear bumper beam to a rear side member. Also in this case, an advantage is provided of improving the efficiency in attachment of peripheral components including a rear cross member.

In addition, according to the invention, not only the working efficiency associated with the attachment of peripheral components can be improved but also the cooling efficiency of the radiator can be increased in an ensured fashion without modifying the layout of the vehicle body, in particular, at the front end of the vehicle body.

What is claimed is:

1. A side member and bumper beam attaching structure, comprising:

a side member of a vehicle body which extends in a longitudinal direction of the vehicle body and which has a closed cross-sectioned end portion at a longitudinal end thereof;

a bracket which is attached to the side member from a front or rear of the vehicle body and which is fitted only into an inside of the closed cross-sectioned end portion and fixed to the side member, the bracket having a bumper abutment portion having an area substantially identical to an area of the closed cross-sectional end; and a bumper beam attached to the bumper abutment portion of the bracket from the front or rear of the vehicle body.

2. A side member and bumper beam attaching structure, comprising:

a side member of a vehicle body which extends in a longitudinal direction of the vehicle body and which has a closed cross-sectional end portion at a longitudinal end thereof;

a bracket which is attached to the side member from a front or rear of the vehicle body and which is fitted only into an inside of the closed cross-sectioned end portion and fixed to the side member; and a bumper beam attached to the bracket from the front or rear of the vehicle body, wherein the closed cross-sectioned end portion of the side member has an external shape which is similar to a shape defined by an inner surface of the cross-sectional shape thereof, and wherein a peripheral component is attached to the closed cross-sectioned end portion.

3. A side member and bumper beam attaching structure, comprising:

a side member of a vehicle body which extends in a longitudinal direction of the vehicle body and which has a closed cross-sectional end portion at a longitudinal end thereof;

a bracket which is attached to the side member from a front or rear of the vehicle body and which is fitted only into an inside of the closed cross-sectioned end portion and fixed to the side member; and a bumper beam attached to the bracket from the front or rear of the vehicle body, wherein the bracket has a guide bolt protruding outwardly in the longitudinal direction of the vehicle body, and the bumper beam is attached to the bracket via the guide bolt.

4. The side member and bumper beam attaching structure as set forth in claim 3, wherein the bracket has a plurality of guide bolts; and two recessed portions are formed between the guide bolts.

5. The side member and bumper beam attaching structure as set forth in claim 3, wherein the side member has an inner surface formed into an octagonal shape; and the guide bolts are disposed in the vicinity of two pairs of confronting sides of the inner surface.

6. The side member and bumper beam attaching structure as set forth in claim 2, wherein the bracket is formed into the same shape as that of the closed cross-sectioned end portion of the side member so as to be fitted only into the inside of the closed cross-sectioned end portion for fixation to the side member.

7. The side member and bumper beam attaching structure as set forth in claim 2, wherein the peripheral component comprises a front cross member with a radiator being supported by the cross member.

8. The side member and bumper beam attaching structure as set forth in claim 2, wherein the peripheral component comprises a front cross member with a radiator being disposed between the cross member and an engine.

9. A side member and bumper beam attaching structure, comprising:

a side member of a vehicle body which extends in a longitudinal direction of the vehicle body and which has a closed cross-sectional end portion at a longitudinal end thereof;

a bracket which is attached to the side member from a front or rear of the vehicle body and which is fitted only into an inside of the closed cross-sectioned end portion and fixed to the side member; and a bumper beam attached to the bracket from the front or rear of the vehicle body, wherein a recessed portion is provided vertically on an inner side of the side member.

10. A side member and bumper beam attaching structure, comprising:

a side member of a vehicle body which extends in a longitudinal direction of the vehicle body and which has a closed cross-sectional end portion at a longitudinal end thereof;

a bracket which is attached to the side member from a front or rear of the vehicle body and which is fitted only into an inside of the closed cross-sectioned end portion and fixed to the side member; and a bumper beam attached to the bracket from the front or rear of the vehicle body, wherein a recessed portion is provided vertically on an outer side of the side member.

11. A side member and bumper beam attaching structure, comprising:

a side member of a vehicle body which extends in a longitudinal direction of the vehicle body and which has a closed cross-sectional end portion at a longitudinal end thereof;

a bracket which is attached to the side member from a front or rear of the vehicle body and which is fitted only into an inside of the closed cross-sectioned end portion and fixed to the side member; and a bumper beam attached to the bracket from the front or rear of the vehicle body, wherein a recessed portion is provided vertically on inner and outer sides of the side member, respectively, the recessed portions so provided being disposed at positions which confront each other in a transverse direction of a vehicle.

* * * * *